United States Patent [19]

Duran, Jr.

[11] Patent Number: 4,662,757

[45] Date of Patent: May 5, 1987

[54] MOTION TRACKING SYSTEM AND METHOD

[75] Inventor: Michael J. Duran, Jr., Lancaster County, Pa.

[73] Assignee: RCA Corporation, Princeton, N.J.

[21] Appl. No.: 611,957

[22] Filed: May 18, 1984

[51] Int. Cl.⁴ .......................................... G01N 21/86
[52] U.S. Cl. ................................... 356/429; 250/561
[58] Field of Search ............................... 356/429–435, 356/372–375, 383–385; 250/548, 559, 560, 571, 561, 572

[56] References Cited

U.S. PATENT DOCUMENTS

| 2,931,917 | 4/1960 | Beelitz | 250/560 X |
|---|---|---|---|
| 3,096,919 | 7/1963 | Snyder | 250/561 X |
| 3,456,118 | 7/1969 | Hartz | 250/559 X |
| 3,621,266 | 11/1971 | Akuta | 356/383 X |
| 3,746,451 | 7/1973 | Croissant et al. | 356/430 X |
| 3,761,723 | 9/1973 | De Cock | 356/383 X |
| 3,812,373 | 5/1974 | Hosoe et al. | 356/430 X |
| 3,835,332 | 9/1974 | Bridges | 356/430 X |
| 3,919,560 | 11/1975 | Nopper | 250/571 X |
| 4,124,300 | 11/1978 | Mead et al. | 356/429 |
| 4,261,013 | 4/1981 | Van Renseen et al. | 250/561 X |
| 4,289,406 | 9/1981 | Maddox | 356/429 |
| 4,303,189 | 12/1981 | Wiley et al. | 250/548 X |
| 4,400,233 | 8/1983 | Rangachar et al. | 156/626 |
| 4,511,803 | 4/1985 | Ross et al. | 356/431 X |
| 4,559,452 | 12/1985 | Igaki et al. | 250/561 X |

Primary Examiner—R. A. Rosenberger
Attorney, Agent, or Firm—E. M. Whitacre; D. H. Irlbeck; L. L. Hallacher

[57] ABSTRACT

The relative transverse position of a measuring device and the aperture patterns in a longitudinally and transversely moving strip of material is held constant. A platform, which supports the measuring device, moves transversely along with the strip. Multi-element energy sensors are supported on the platform at the longitudinal edges of the pattern. Different numbers of elements are illuminated when the strip is off center and a difference signal is provided. The difference signal is used to move the platform to maintain the desired constant transverse relative positioning.

14 Claims, 9 Drawing Figures

MOTION TRACKING SYSTEM AND METHOD

BACKGROUND OF THE INVENTION

This invention relates generally to the tracking of the transverse motion of an aperture pattern in a longitudinally moving strip of material and particularly to maintaining the relative transverse positions of densitometers and a shadow mask web during the production of kinescope shadow masks.

In the manufacture of shadow masks for color television kinescopes a roll of flat metal material is coated with a photoresist material and is subsequently photoexposed to form a series of aperture patterns and the peripheries of the shadow masks in the photoresist material. The unexposed photoresist material is washed away leaving bare metal. The strip of material is subjected to an acid etching process in which the bare metal is removed to form the apertures and partialy etched peripheries used to remove the shadow masks from the strip of material. After the etching is completed the transmission of light through the apertures is measured to verify that the shadow masks are suitable for the intended use. The measurement of light transmission through the apertures typiCally is accomplished by shining a known intensity of light through the apertures and noting the percenage of light which passes through the apertures. The acid etching and the light transmission measurements typically are made while the strip of material is pulled longitudinally along a conveyor line. Because of the long length of the strip, there is a tendency for the strip to move transversely back and forth perpendicular to the longitudinal motion. The areas of the apertures varies along the transverse dimension of the pattern and for this reason, accuracy of the light transmission measurement requires that all measurements be made at the same transverse position of the aperture pattern. Accordingly, the transverse motion causes a degregation of the measurement accuracy. It is extremely difficult, if not impossible, to restrain the long strip and prevent the transverse motion. For this reason, there is a need for a system for tracking the transverse motion of the strip so that the measuring densitometer maintains a constant relative transverse position with respeot to the strip. The instant invention fulfills this long felt need.

CROSS REFERENCE TO RELATED APPLICATIONS

This invention can be used to control the motion of the sensing device described in application Ser. No. 611,997 entitled "MOTION TRACKING DEVICE" filed on even date herewith by Michael J. Duran, Jr.

SUMMARY

A system for maintaining the relative positions of a moving aperture pattern measuring devices, incudes a transversely moveable platform for supporting the measuring devices. First and second sensors, each having an equal purality of energy responsive elements, are fixed to the platform in positions whereby the longitudinal edges of the aperture pattern longitudinally move between two of the elements of each sensor. First and second energy sources are fixed to the platform and positioned to pass energy to the sensors through the aperture pattern to illuminate portions of the elements. The sensors are positioned on the platform whereby an equal number of elements in each sensor is illuminated when the platform is centered over the strip. Circuit means is selectively responsive to the sensor elements whereby the sensors alternately provide output signals. The circuit means includes means for dividing the sensor elements into groups whereby groups of output signals are sequentialy provided by the means for dividing. An output network sequentially responds to the groups of output signals. A storage means responds to the output network and stores the output signals at particular addresses in accordance with the groups, whereby signals having a first level are stored for illuminated elements and signals having a second level are stored for unilluminated elements. The number of signals having the first level are counted for both sensors to provide first and second illuminated element counts. The iluminated element counts are compared and a difference signal is provided to effect motion of the moveable platform to reduce the difference signal to zero.

DETAILED DESCRIPTION

Figure 1:
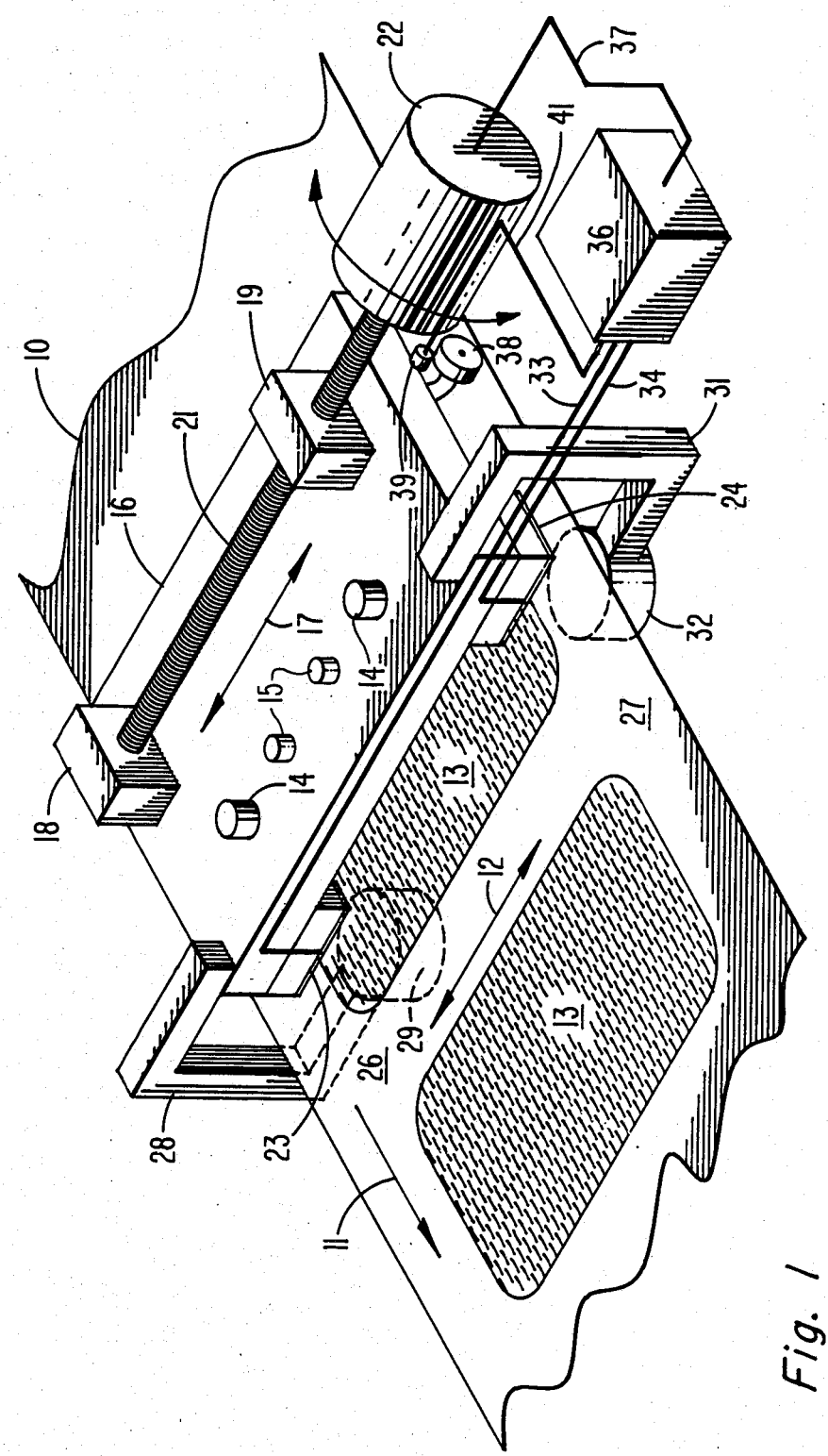
FIG. 1 is a perspective view of a sensing device which can be used with the invention.

FIG. 1 shows a sensing device of the type described in copending application Ser. No. 611,997 which can be used with the instant invention. A strip of material 10 moves longitudinally in the direction indicated by the arrow 11. As is known to those skilled in the shadow mask art, the strip 10 is many feet in length and is pulled along by rollers (not shown). For this reason, the strip 10 also has a tendency to move transversely back and forth as indioated by the arrow 12. The strip 10 has been etched to form a succession of shadow masks, each of which includes an aperture pattern 13 containing a large number of apertures. An important feature of a shadow mask is the ability to transmit electron beams through the apertures. The acceptability of the transmission capability typically is determined by measuring the light transmission capabiity of the aperture patterns. This measurement typically is made by passing light of known intensity through the apertures and measuring the percentage of light which passes through the apertures with densitometers. As explained in the referenced application Ser. No. 611,997 the accuracy of the light transmission measurements is enhanced by maintaining the densitometers at a constant transverse position with respect to the transversely moving aperture patterns.

In the novel system, the constant relative transverse positioning is maintained using a transversely moveable platform 16 arranged parallel to the surface of the strip 10. As indicated by the arrow 17, the platform 16 is moveable in a direction substantially perpendicular to the longitudinal axis of the strip 10 and parallel to the transverse motion of the strip 10 indicated by the arrow 12. Affixed to the platform 16 are two ball nuts 18 and 19 which are threaded to receive a lead screw 21. The lead screw 21 is driven by a motor 22. Accordingly, transverse motion of the platform 16 is affected by turning the motor 22 either clockwise or countercockwise to effect the desired transverse motion of the platform.

Energy sensors 23 and 24 are supported by the platform 16 between the platform and the shadow mask aperture patterns 13. Each of the energy sensors 23 and 24 contains a large number of energy responsive elements. Preferably, the energy sensitive arrays 23 and 24 are phototransistor arrays each having 56 phototransistors. Such arrays are commonly available in the art, for example, Model No. BPW-17N arrays available from AEG Telefunken can be utilized. The array 23 is arranged so that some of the phototransistors are opposite the aperture pattern 13 and some of the phototransistors are opposite the opaque border 26 of the strip 10. Similarly, the array 24 is arranged so that some of the phototransistors are opposite the aperture pattern 13 and the other phototransistors are opposite the other opaque border 27. Thus, the arrays track the longitudinal edges of the aperture pattern 13. A light souroe 29 is arranged on the side of the strip 10 opposite from the array 23 whereby the phototransistors which are opposite the aperture pattern 13 are illuminated through the apertures. A similar light source 32 is arranged along the other side of the strip 10 to illuminate the phototransistors of the array 24 through the apertures of the pattern 13. Suitable conductors 33 and 34 couple the phototransistors of the arrays 23 and 24, respectively to a processing unit 36. An output line 37 of the processing unit 36 actuates the motor 22 to effect either clockwise or counterclockwise rotation of the lead screw 21 to transversely move the platform 16 in the desired direction. This motion maintains an equal number of phototransistors illuminated in each of the arrays 23 and 24 to maintain constant reative transverse positions of the aperture patterns 13 and the densitometers 14.

A longitudinal motion sensor 38 senses the longitudinal motion of the strip 10 to avoid any effort to move the platform 16 transversely when the strip 10 is not moving longitudinally. Additionally, light sensors 15 can be energized through the aperture patterns 13 by a light source, not shown, to inhibit the processing unit 36 when the opaque separators between adjacent aperture patterns pass between the arrays 23,24 and the light sources 29,32.

Figure 2A:
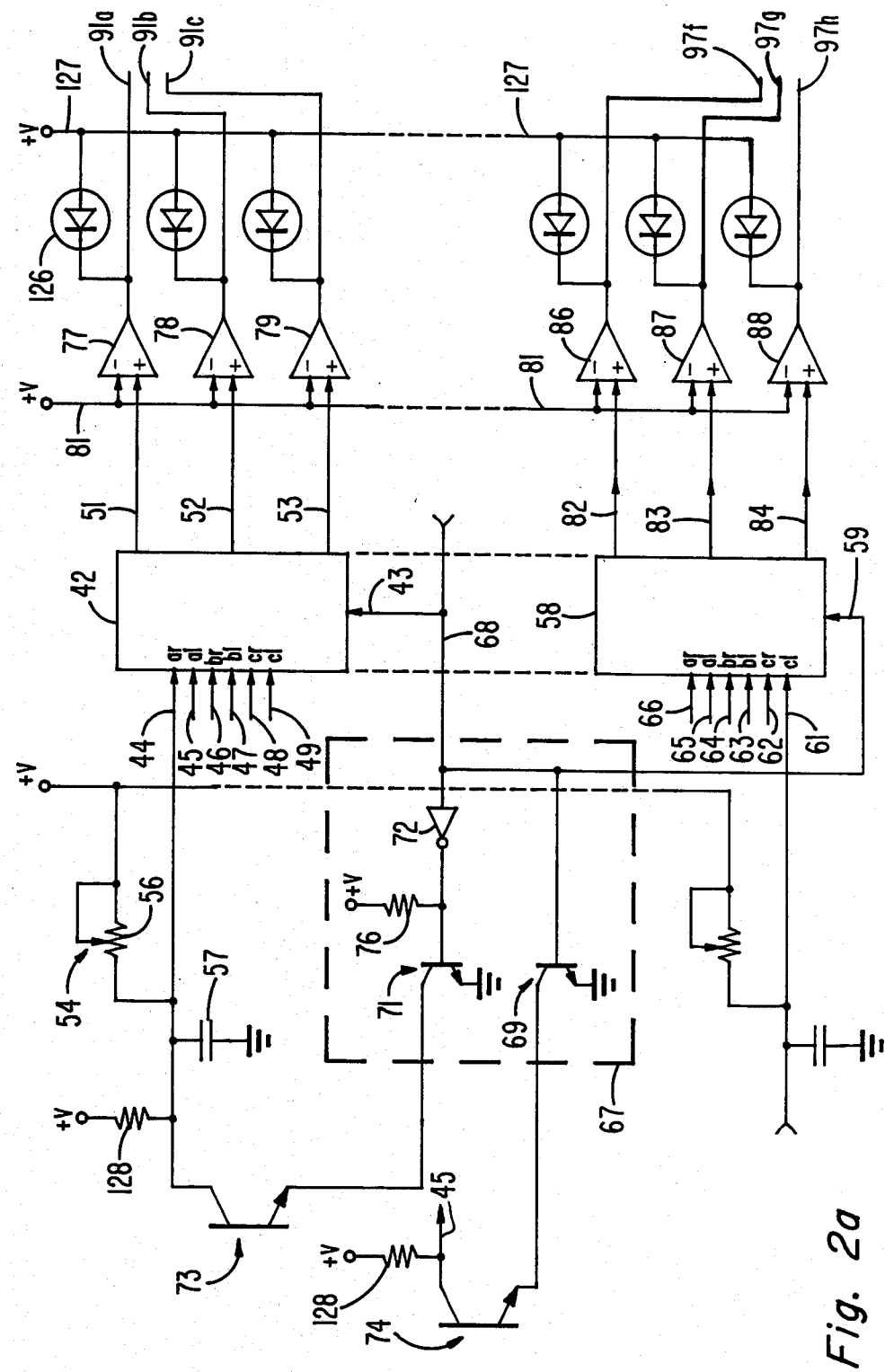
FIGS. 2a and 2b are a block diagram of a preferred embodiment.

In FIG. 2a, the processing unit 36 includes a switching circuit 42 having a control input lead 43 and a plurality of input lines 44 through 49. The switching circuit 42 also includes three output lines 51, 52 and 53. Each of the input lines 44 through 49 is connected to one of the phototransistors in one of the arrays 23 or 24 of FIG. 1. Each of the input lines 44 through 49 is biased to a positive voltage by a circuit similar to the circuit 54 which includes a variable resistor 56 and a capacitor 57. The input ines 44 through 49 are connected to the phototransistors of the arrays 23 and 24 such that adJacent lines are coupled to different arrays, thus, for example, the input line 44 can be connected to the phototransistor within the array 23 which is closest to the edge of the opaque border 26 of the metal strip 10. The input line 45 then would be connected to the phototransistor within the array 24 which is closest to the edge of the opaque border 27. Accordingly, when the phototransistor arrays 23 and 24 each include 56 phototransistors, the processing unit 36 includes enough of the switching circuits to provide an input lead for each of the phototransistors and thus twenty identical circuits would be used. A switching circuit 58 also includes a control terminal 59 and input leads 61 through 66. The input lead 61 can be connected to the phototransistor of the sensor 24 which is closest to the center of the aperture pattern 13 and the input lead 62 is connected to the phototransistor within the array 23 which is closest to the center of the aperture pattern 13.

The control lines 43 and 59 of the switching circuits 42 and 58, respectively, are coupled to a line 68 of a sensor selection circuit 67. The logic level on the line 68 determines whether the signals on the output lines 51, 52 and 53 of the switching circuit 42 and on the output lines 82, 83 and 84 of the switching circuit 58 are provided by the array 23 or 24. Thus, for example, when the line 68 is high the array 23 is selected and the input lines 44, 46 and 48 of the switching circuit 42 provide the output signals on the output lines 51, 52 and 53. When the logic level of the line 68 is low, the array 24 is selected and the input lines 45, 47 and 49 provide the output signals on the output lines 51, 52 and 53. All the switching circuits within the processing unit 36 are simultaneously controlled by the line 68 so that every phototransistor within one of the arrays 23 or 24 simultaneously provides an output for one of the output circuits. The level of the output lines of the switching circuits 42 and 58 follows the levels of the input lines. For example, in an instance when the input line 68 is high, so that the array 23 is selected and the input lines 44 and 46 are high while the input line 48 is low the output lines 51 and 52 will be high and the output line 53 low. Thus, the signals on the output lines of all the switching circuits are simultaneously representative of the status of all the phototransistors within either the sensor 23 or 24.

The array selection circuit 67 includes two transistors 69 and 71 the emitters of which are grounded. The base of the transistor 69 is coupled directly to the line 68 and the base of the transistor 71 is connected to line 68 through an inverter 72. The collector of the transistor 71 is coupled to the emitter of every phototransistor within the array 23, as represented by the phototransistor 73. Similarly, as represented by phototransistor 74, the collector of transistor 69 is coupled to the emitter of every phototransistor within the array 24. Accordingly, all the phototransistors within either the array 23 or the array 24 are simultaneously grounded in accordance with the states of the transistors 69 and 71. As indicated by the biasing resistors 128 and +V source, the emitters of all the phototransistors within the arrays 23 and 24 are positive biased. The emitters of eaoh of the phototransistors within the array 23 are coupled to an input line of one of the switching circuits, e.g. transistor 73 is coupled to line 44. The transistors in the array 24 also are coupled to input lines of the switching circuits, e.g. transistor 74 is coupled to the line 45. The phototransistors 73 and 74 are nonconductive when not illuminated. Accordingly, the switching circuit input lines are high for nonilluminated phototransistors and low for illuminated phototransistors.

In operation when ine 68 is high, the base of transistor 69 is high to turn the transistor on and ground the phototransistors within the array 24 causing all input lines to the switching circuits from that array to go low. The high on line 68 is inverted by inverter 72 to cancel the biasing voltage applied by the resistor 76 and the transistor 71 is turned off. Accordingly, the nonilluminated phototransistors within the array 23 provide high inputs to the switching circuits 42 and 58 and the illuminated phototransistors provide low inputs. When line 68 is low, the base of transistor 69 also is low and the transistor is off. The unilluminated phototransistors of the array 24 provide high inputs to the switching circuits 42 and 58 and illuminated phototransistors provide low inputs. The low on the base of transistor 71 from line 68 is inverted by inverter 72 to turn on transistor 71 and ground the phototransistors within the array 23.

The signal on line 68 also is coupled to the switching inputs of all the switching circuits. Thus, line 68 is coupled to switching inputs 43 and 59 of switching circuits 42 and 58 respectively. This input synchronizes the switching circuit output lines with the phototransistor array selected. Accordingly, when the array 23 is selected output lines 51 to 53 follow the signals on the input lines coupled to that array. As shown, the switching circuit 42 has input terminals labeled "l" for left and "r" for right. When line 68 is low the left sensor is selected and the signals on output lines 51 to 53 are provided by the "l" input lines. Thus, the output lines 51 to 53 of the switching circuit 42 and lines 82 to 84 of switching circuit 58 follow the levels of the input lines in accordance with the illumination status of the phototransistors within the selected array. The manner in which the signal on line 68 is changed is explained hereinafter with respect to FIGS. 3a to 3f.

The output lines 51, 52 and 53 of the switching circuit 42 are respectively coupled to the positive inputs of comparators 77, 78 and 79. The negative inputs of the comparators are biased to a reference voltage by a line 81. Similarly, output lines 82, 83 and 84 of the switching circuit 58 are coupled to the positive terminals of comparators 86, 87 and 88. The negative inputs of the comparators 86 to 88 also are biased by the line 81. When the voltage on the positive terminal rises above that provided by the line 81 the normally low inverter output goes high. A latch circuit 89 (FIG. 2b) having eight input leads 91a to 91h receives inputs from the comparators 77 to 79 and from five other comparators which are not shown for simplicity. Thus, the input lead 91a is coupled to the output of the comparator 77 and the input lead 91b is coupled to the output of the comparator 78, etc. The number of latch input leads is determined by the number of phototransistors in the arrays 23 and 24. For example, when the arrays each have 64 phototransistors 64 latch input lines are needed and 8 latch circuits are used.

Control signals are provided to the latch 89 by a line 94. Clock pulses are provided to latch 89 and to all the latches by lines 93 and 99. When clock pulses are provided to the clock input 93 and when the level of the control input on line 94 goes from high to low, the latch 89 is actuated and the output lines 92a through 92h latch onto the logic levels of the input lines 91a through 91h. A latch circuit 96, which is identical to the latch 89, has input leads 97a to 97h and output leads 98a to 98h. The latch 96 also receives clock input pulses from the clock lead 93 and the lead 99. Control pulses are received by the latch 96 from the line 101. Accordingly, the input lines 97a through 97h of the latch 96 receive inputs from the phototransistors which are closest to the center of the aperture pattern 13 of FIG. 1 and the latch 89 receives inputs from the phototransistors nearest to the opaque borders 26 and 27.

The output leads of all the latches are connected to a biasing network 102 and to the input leads 100a to 100h of an output network 103 in the same manner shown for the leads 92a to 92h and 98a to 98h. The individual output leads of every latch circuit thus provides an input to one of the input leads 100a to 100h of the output network 103. The input lines 100a to 100h are biased positive and, therefore, the transistors within the output network 103 are turned on and the output lines 104 to 111 are normally low. When a low input is received from a latch output the associated transistor turns off and the output line goes high. Accordingly, the output lines 104 through 111 of the output network 103 follow in inverse fashion the output lines of the latch being utilized at a particular time.

Figure 2B:
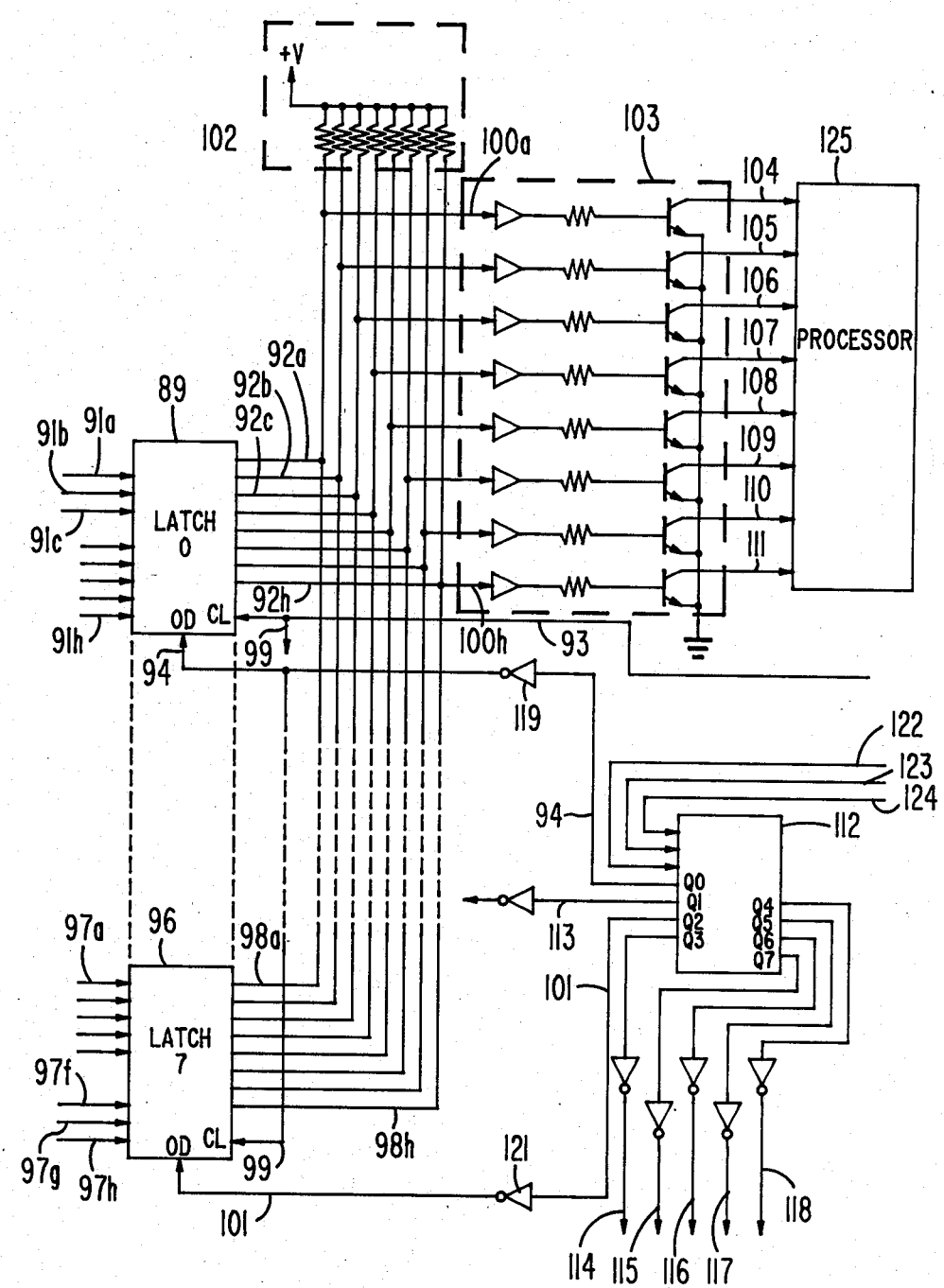

A latch selection circuit 112 has eight normally low output terminals Q0 to Q7. The output terminals are connected to the selection leads 94, 101 and 113 to 118. The output leads 94, 101 and 113 to 118 are individually connected to the control leads of the latch circuits. For example, as shown in FIG. 2b, the line 94 is coupled to the latch 89 through an inverter 119 and the line 101 is coupled to the latch 96 through an inverter 21. The output terminals Q0 to Q7 of the latch selection circuit 112 are normally low and, therefore, the control input terminals of the latches are normally high and changes to the input lines of the latches have no affect on the latch output leads. The latch selection circuit 112 has three input leads 122, 123 and 124. Each of the latches is assigned a binary number; for example, the latches 89 and 96, respectively can be 0 and 7. The binary number of the latch to be actuated is provided to the latch selection circuit 112 by the input leads 122, 123 and 124 and one of the output terminas Q0 to Q7 of the latch selection circuit 112 goes high. This high is inverted and the control input lead of the selected latch goes low to actuate the latch. The output leads of the selected latch circuit change to be the same as the levels on the latch circuit input lines to provide input signals to the output network 103.

A light emitting diode (LED) such as 126 (FIG. 2a) is provided between a positively biased line 127 and the output lead of each of the comparators 77 to 79 and 86 to 88. Accordingly, every phototransistor in the selected array 23 and 24 has a corresponding LED. The LEDs are normally off and track the condition of the phototransistors. Thus, when a phototransistor receives light through the aperture pattern 13, the illuminated condition is indicated by the LED being turned on. This permits visual tracking of the operation of the system.

In operation, a biasing resistor, as ilustrated by the resistors 128, in FIG. 2a, is coupled to the collector of every phototransistor within each of the arrays 23 and 24. Accordingly, initially all of the input lines to the switching circuits 42 and 58, and the other switching circuits within the system, are biased high. However, the status of the output lines 104 to 111 (FIG. 2b) remains unchanged from that determined by the last latch investigation. When an array selection signal is received on line 68, one of the transistors 69 or 71 is off and the other is on and the left "l" or right "r" inputs of the switching circuits 42 and 58 are selected consistent with whether the left or right sensor is selected. Assuming that the array 23 including the phototransistor 73 has been selected, all illuminated phototransistors of the array provide low inputs to the switching circuits and all unilluminated phototransistors continue to provide high inputs. These inputs are provided to all the latches, e.g., 89 and 96, through the switching circuits and comparators. However, the output lines 104 to 111 remain unchanged until one of the latches is selected by the latch selection circuit 112. Upon such selection, the eight inputs to the selected latch are provided to the output circuit 103 and thus to a microprocessor 125. The latches are sequentially selected until all are selected. After the last latch is investigated the switching signal on line 68 is changed to select the other array and the sequential investigation of the latches is repeated.

The output lines 104 to 111 of the output network 103 are coupled to the input ports of the microprocessor 125 which includes a memory and a counter. Each of the latches is assigned a specific address for each of the right and left sensors and the data are stored until all latches have been investigated for all sensors. The coupling of the output lines 104 to 111 to the microprocessor can be effected throughout opto-isolators to provide the desired electrical isolation between the two portions of the system if desired. Several available microprocessors can be used for example the combination of a Mostec MK38P73720P-00 and MK2716J-8 can be used as the microprocessor. Alternatively, other types of memory devices, such as RAM's can be used.

Figure 3A:
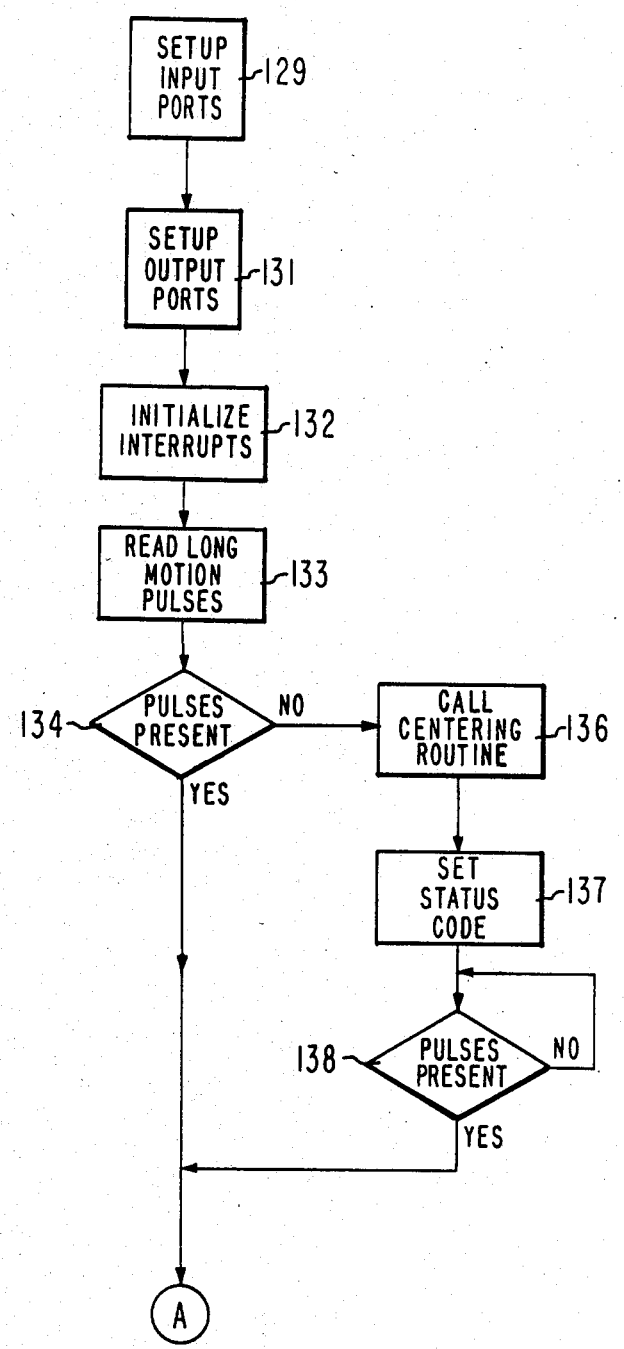
FIGS. 3a to 3f are a flow chart of preferred embodiment of the data processor of FIG. 2b.
Figure 3B:
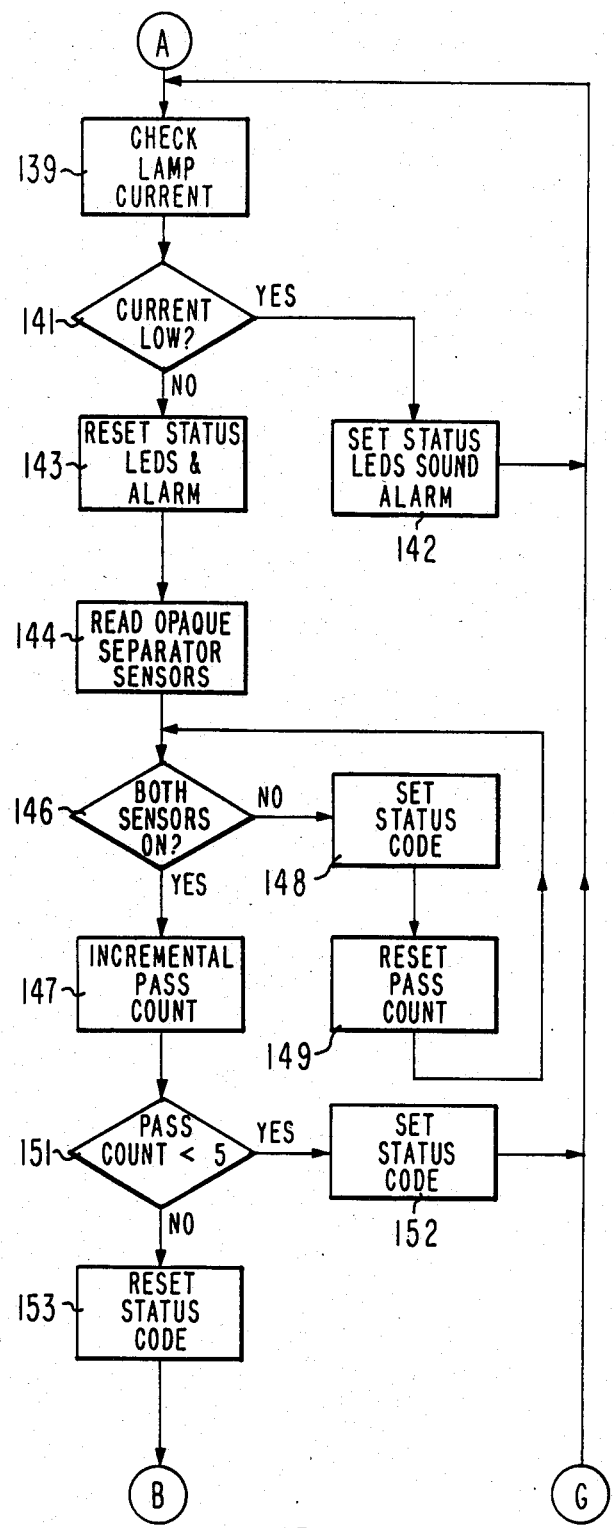

A preferred embodiment of a microprocessor is shown in FIGS. 3a-3f. In FIG. 3a, at step 129, the microprocessor ports which are to be used as input ports are set up. At step 131, the microprocessor ports which are to be used as output ports are set up. It should be noted that in this application, a port is a group of eight microprocessor terminals which are used as either input terminals or output terminals. At step 132 the interrupts are initialized. At step 133, the longitudinal motion pulses are read. This is the reception of the pulses received from the longitudinal motion sensor 38 of FIG. 1. At step 134, when the longitudinal motion pulses are not present, step 136 is entered to center the moveable platform 16 of FIG. 1 over the center of the strip 10. At step 137, the status code is set. This lights a combination of LEDs to show the status of equipment. At step 138, the presence of the longitudinal pulses is again checked when the pulses are not present this step is repeated until the pulses are present when the strip 10 has begun longitudinal movement. When pulses are present at either step 134 or 138, step 139 of FIG. 3b is entered to check the lamp current. This is a check to verify the current flow of the lamps which provide the light to the sensors 29 and 32. At step 141, if the lamp current is low, this information is set in the LEDs established at step 137 and an alarm is sounded at step 142 so that any needed corrective action can be taken. When the lamp current is proper, step 143 is entered to reset the status LEDs and alarm to indicate that the system is ready for operation. At step 144, the opaque separator sensors are read. These are the sensors which inhibit the system when the opaque material between adjacent aperture patterns is between the diode arrays 23 and 24 and the light sources 29 and 32. This verifies that each of the light sensors 15 is positioned to receive light through an aperture pattern to verify that an opaque separator between adjacent aperture patterns is not present between the sensors 23 and 24 and the energy sources 29 and 32. At step 146, when both the sensors 15 are on, step 147 is entered to begin an incremental pass count. This count is set to a preselected count to inhibit detection until a required minimum portion of the aperture pattern 13 has passed beneath the phototransistor arrays 23 and 24. This inhibiting is used because the aperture patterns for shadow masks are curved at the corners and therefore many rapid changes would occur at the arrays 23 and 24 and substantial hunting would result if correction were attempted immediately after detecting the apperture pattern. The exact inhibiting needed is determined by the running speed of the strip 10, the curvature of the corners, etc. At step 146, if both sensors are not on, step 148 is entered to set the status code. Step 149 is then entered to reset the pass count and return to step 146. This cycling continues until both the sensors 15 are on and occurs each time an opaque separator is aligned with the arrays 23 and 24. At step 151, when the pass count is less than the preselected count of 5 for the preferred embodiment, step 152 is entered to reset the status code and return to step 139. At step 151 when the preselected number of pass counts have been detected, the status code is reset at 153.

Figure 3C:
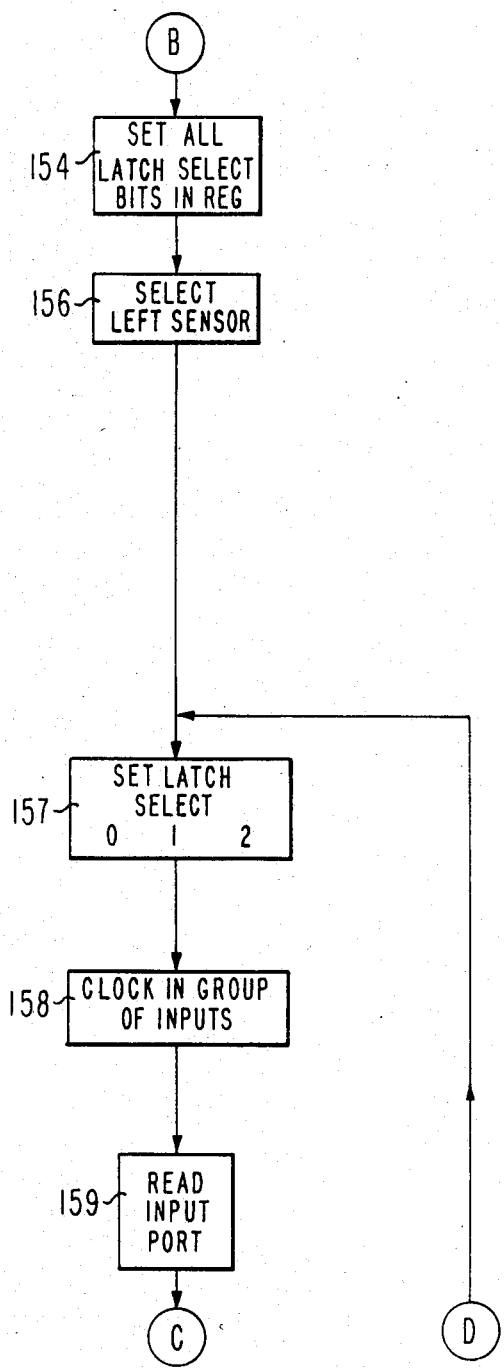
Figure 3D:
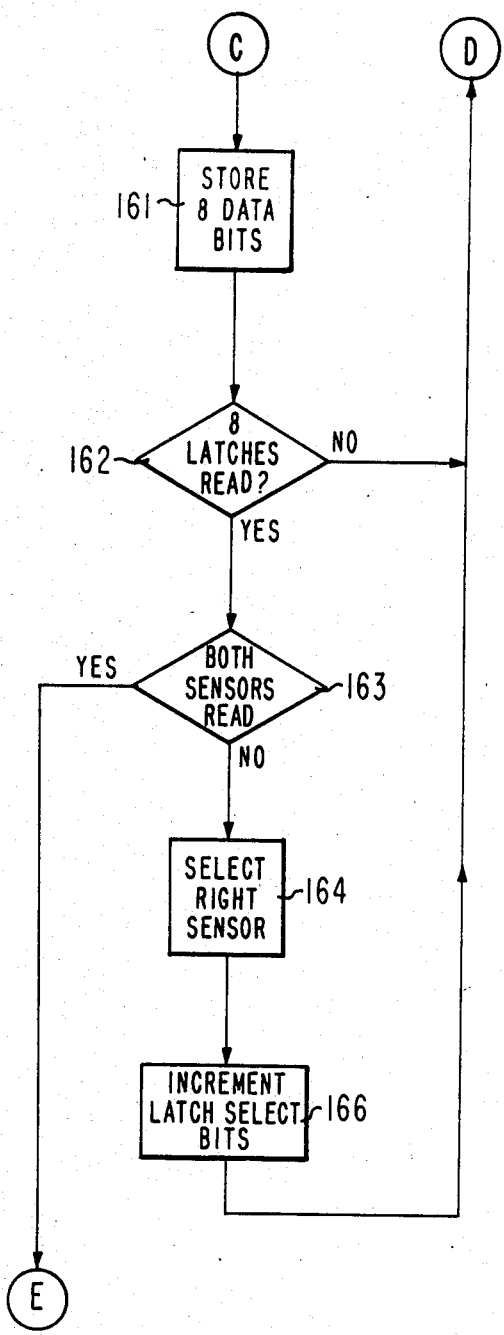

At step 154, FIG. 3c, latch select bits are set into the register. This step is used to set the binary numbers which are provided to the latch selection circuit 112 (FIG. 2a) into the system. At 156, the left sensor is selected to set the switching circuits 42, etc. (FIG. 2a) to the left sensor.

At step 157, the latch circuit to be investigated is set. Thus, referring to FIG. 2b, when the latch 89, identified as 0, is to be investigated the binary definition of 0 is applied to input lines 122, 123 and 124 of the latch selection circuit 112. Similarly when latch 96, identified as 7, is to be investigated the binary definition of 7 is input to the input lines 122 to 124. When a latch circuit is selected, the signals on the latch input lines of the selected latch are clocked to the output lines 104 to 111 at step 158. At step 159, the input terminals of the processor 125 are read and the signals on output lines 104 to 111 are clocked into memory at the assigned addresses and the 8 data bits are stored at 161, FIG. 3d. At step 162, when all of the latch circuits have not been read, step 157 is reentered and the binary number of the next latch is provided to the latch selection circuit 112 of FIG. 2. When all eight latches have been read, step 163 is entered to determine whether both the sensors 23 and 24 have been read. When both sensors have not been read, step 164 is entered to select the unread, e.g., the right array. At 166, the latch selection bits are incremented and step 157 of FIG. 3c is reentered to provide the bniary number of the first particular latch to be investigated for the second array.

Figure 3E:
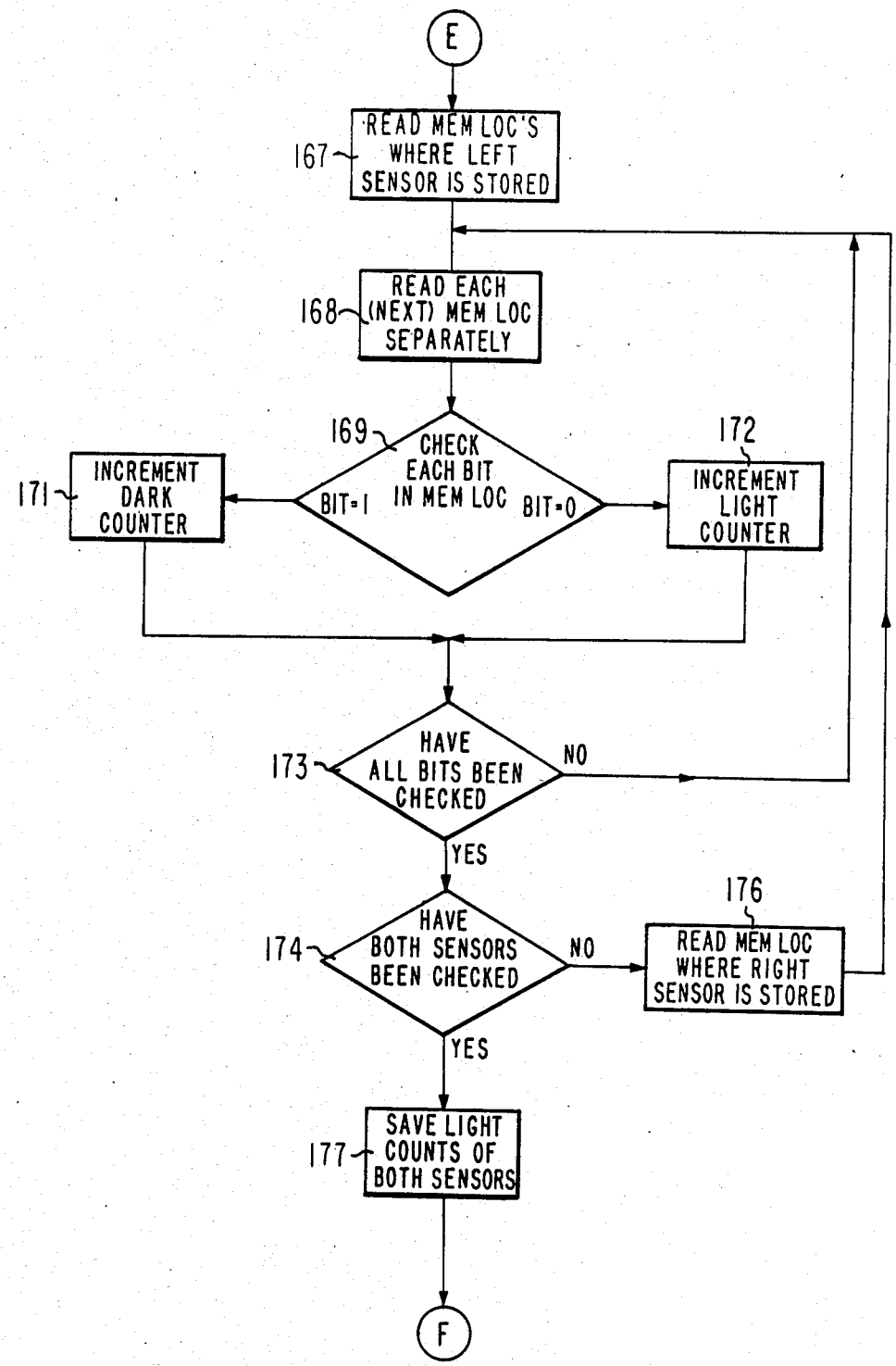
Figure 3F:
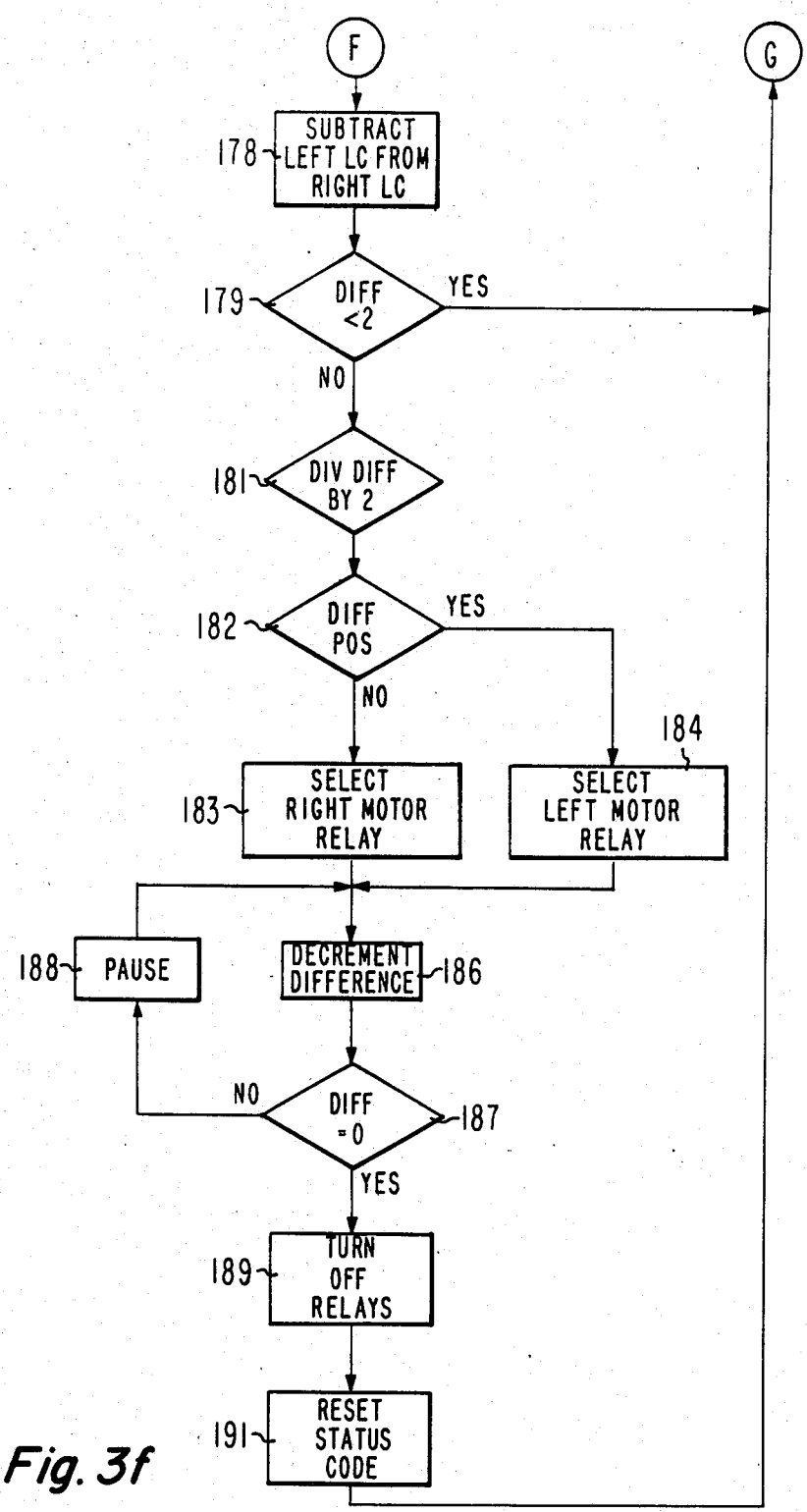

At step 163, when both sensors have been read, step 167, FIG. 3e, is entered to read the memory locations where the left sensor data are stored. Step 168 is then entered to separately read each memory location. At 169, the illuminated or nonilluminated condition of each phototransistor within the array being investigated is checked. Unilluminated phototransistors are logic 1 and increment the dark counter at step 171 and illuminated phototransistors are logic 0 and increment the light counter at step 172. As each bit is checked, step 173 is used to continue the check until all bits have been checked and step 174 is used to determine whether both arrays 23 and 24 have been investigated. When both arrays have not been investigated, step 176 is used to read the memory locations where the right sensor data are stored and step 168 is reentered to repeat the process for the right array. After both sensors have been read, the number of illuminated phototransistors, i.e., the light counts, for each of the arrays are stored at step 177. The left light count is subtracted from the right light count at step 178, FIG. 3f, the difference is indicative of the displacement of the strip 10, FIG. 1, from the desired centered longitudinal position. When the difference between the light counts of the two arrays is less than two at step 179, the off-center positioning of the strip 10 is not worthy of correction and step 139, FIG. 3b, is reentered to repeat the entire process. When the difference is greater than two at step 179, step 181 is entered to divide the difference by two. The difference is divided by two because a shift of one phototransistor results in a difference of two illuminated phototransistors on the arrays 23 and 24. Thus, for example, when the material strip 10 has shifted three phototransistors, one sensor has six more illuminated phototransistors than the other. Accordingly, dividing the difference by two yields the number needed to effect the necessary correction. After the difference is divided by two, step 182, FIG. 3g, is entered to determine whether the difference is positive or negative. When the difference is negative, step 183 is entered to select the left motor relay to effect a counter-clockwise rotation of the motor 22 of FIG. 1. When the difference is negative, step 184 is entered to select the right motor relay and effect clockwise rotation of the motor 22. At step 186, the difference is decremented and at step 187 when the difference has not been decremented to zero step 188 is used to pause the process. This pause allows time for the motor 22 to effect the needed motion. Thus, for example, if the difference is three the pause allows time to move the effective distance of three phototransistors. When the difference becomes zero, the motor relays are turned off at 189 and 191 is used to reset the status code and return to step 139, FIG. 3b. Upon reentry to step 139, the entire correction process is repeated. Accordingly, the system provides constant, uninterrupted centering of the densitometers 14 with respect to the strip 10.

What is claimed is:

1. A system for maintaining the relative positions of an aperture pattern in a longitudinally and transversely moving opaque strip of material and measuring devices for measuring the energy transmission through said aperture pattern comprising:

a longitudinally fixed and transversely moveable platform for supporting said measuring devices, said platform being moveable in a direction substantially parallel to the transverse motion of said strip, first and second sensors each having a plurality of energy responsive elements fixed to said platform in positions whereby the longitudinal edges of said aperture pattern longitudinally move between two elements of each of said sensors, first and second energy sources fixed to said platform and respectively positioned to pass energy to said sensors through said aperture pattern to illuminate a portion of said elements of each sensor, said first and second sensors being positioned on said platform whereby an equal number of elements in each sensor is illuminated when said platform is centered over said strip;

circuit means responsive to said elements of said sensors, said circuit means including array selection circuit means for alternately selecting said sensors whereby said sensors alternately provide output signals, said circuit means also including means for dividing said output signals from each of said sensors into groups whereby groups of output signals are sequentially provided by said means for dividing;

output network means sequentially responsive to said groups of output signals;

storage means responsive to said output network means for storing said output signals at particular addresses in accordance with said groups, whereby signals having a first level are stored for illuminated elements and signals having a second level are stored for unilluminated elements;

means for sequentially counting the number of signals having said first level for said first and second sensors to provide first and second illuminated element counts;

means for comparing said illuminated element counts and providing a difference signal; and means responsive to said difference signal for actuating drive means to effect motion of said moveable platform to reduce said difference signal to zero.

2. The system of claim 1 further including detection means for receiving energy through said aperture patterns and for inhibiting said system when the opaque material between successive aperture patterns is opposite to said first and second sensors.

3. The system of claim 2 further including means for sensing longitudinal motion of said strip and for inhibiting said system in the absence of such motion.

4. The system of claim 3 wherein said first and second sensors are phototransistor arrays and said energy is light.

5. The system of claim 3 further including means for inhibiting said system for a preselected pulse count after an aperture pattern is first detected.

6. A system for maintaining the relative positions of an aperture pattern in a longitudinally and transversely moving opaque strip of material and measuring devices for measuring the energy transmission through said aperture pattern comprising:

a moveable platform for supporting said measuring devices arranged substantially parallel to the plane of said strip of material, said platform being longitudinally fixed and bilaterally moveable in a direction substantially parallel to the transverse motion of said strip of material; a first sensor having a plurality of energy responsive elements fixed to said platform in a position whereby one longitudinal edge of said aperture pattern longitudinally moves between two of said elements, a first energy source fixed to said platform and positioned to pass energy to said first sensor through said aperture pattern to illuminate a portion of said elements, a second sensor having a plurality of energy responsive elements fixed to said platform in a position whereby the other longitudinal edge of said aperture pattern longitudinally moves between two elements of said second sensor, a second energy source fixed to said platform and positioned to pass energy to said second sensor through said aperture pattern to illuminate a portion of the elements of said second sensor, said first and second sensors being positioned on said platform whereby an equal number of elements in each sensor is illuminated when said platform is centered over said strip;

a plurality of switching means, each of said switching means being responsive to equal portions of said elements of said first and second sensors;

sensor selection means for alternately actuating said switching means whereby the energy conditions of said elements of said first and second sensors are alternately provided as the output signals of said switching means;

a plurality of latch circuits, each of said latch circuits being responsive to a portion of said switching means whereby the energy level of each element of said arrays establishes the level of an output of one of said latches and said elements are divided into groups by said latch circuits;

an output network, responsive to said latch circuit outputs;

latch circuit selection means for individually and sequentially actuating said latch circuits whereby said latch outputs are sequentially provided to said output network;

storage means responsive to said output network for storing said latch outputs at particular addresses in accordance with said groups, whereby signals having a first level are stored for illuminated elements and signals having a second level are stored for unilluminated elements;

means for sequentially counting the number of signals having said first level for said first and second sensors to provide first and second illuminated element counts;

means for comparing said illuminated element counts and providing a difference signal; and means responsive to said difference signal for actuating drive means to effect motion of said moveable patform to reduce said difference signal to zero.

7. The system of claim 6 further including detection means for receiving energy through said aperture patterns and for inhibiting said system when the opaque material between successive aperture patterns is opposite to said first and second sensors.

8. The system of claim 7 further including means for sensing longitudinal motion of said strip and for inhibiting said system in the absence of such motion.

9. The system of claim 8 wherein said first and second sensors are phototransistor arrays and said energy is light.

10. The system of claim 8 further including means for inhibiting said system for a preselected pulse count after an aperture pattern is first detected.

11. A method of sensing the longitudinal edges of an aperture pattern in a transversely and longitudinally moving strip of material comprising the steps of:

arranging a transversely moveable and longitudinally fixed platform substantially parallel to the plane of said strip and substantially perpendicular to the longitudinal axis of said strip;

arranging arrays of energy sensitive elements on said platform and in the proximity of the longitudinal edges of said aperture pattern such that when said strip is centered equal numbers of elements in each array are opposite said aperture patterns and equal numbers of elements in each array are opposite the opaque borders of said strip;

arranging energy sources on said platform in positions to individually provide energy to the elements of said arrays whereby the elements opposite said aperture pattern receive energy and the elements opposite said opaque borders are shielded from energy;

successively detecting the energy condition of the elements of the arrays and storing! signals having one level for illuminated elements and another level for unilluminated elements;

comparing the number of illuminated elements for the two sensors and producing a difference signal;

actuating a drive means in accordance with said difference signal to transversely move said platform in the direction of transverse motion of said strip to maintain substantially the same number of elements in each of said arrays illuminated through said aperture pattern to reduce said difference signal to zero whereby the relative transverse positions of said aperture pattern and said device for measuring are maintained.

12. The method of claim 11 further including the step of sensing the opaque material between successive aperture patterns and inhibiting transverse platform motion when said opaque material is in the proximity of said sensors.

13. The method of claim 12 further including the step of temporarily inhibiting said transverse platform motion for a preselected pulse count after said aperture is first detected.

14. The method of claim 13 further including the step of sensing the longitudinal motion of said strip and inhibiting said transverse platform motion in the absence of said longitudinal motion.

* * * * *